(12) United States Patent
Wilkinson et al.

(10) Patent No.: US 7,568,062 B2
(45) Date of Patent: Jul. 28, 2009

(54) DATA CUT-THROUGH IN AN INFINIBAND/FIBRE CHANNEL BRIDGE

(75) Inventors: Keith Iain Wilkinson, Fremont, CA (US); Jonathan Rollo Pearce, Sherwood, OR (US)

(73) Assignee: Cisco Technology, Inc., San Jose, CA (US)

( * ) Notice: Subject to any disclaimer, the term of this patent is extended or adjusted under 35 U.S.C. 154(b) by 132 days.

(21) Appl. No.: 11/469,383

(22) Filed: Aug. 31, 2006

(65) Prior Publication Data

US 2007/0143522 A1 Jun. 21, 2007

Related U.S. Application Data

(60) Provisional application No. 60/752,688, filed on Dec. 21, 2005.

(51) Int. Cl.
*G06F 13/00* (2006.01)
(52) U.S. Cl. .................................. 710/315; 370/402
(58) Field of Classification Search ......... 710/300–317; 370/402
See application file for complete search history.

(56) References Cited

U.S. PATENT DOCUMENTS

| 6,983,303 | B2 * | 1/2006 | Pellegrino et al. | 709/203 |
| 7,072,970 | B2 * | 7/2006 | Georgiou et al. | 709/230 |
| 2004/0024905 | A1 * | 2/2004 | Liao et al. | 709/239 |
| 2005/0165786 | A1 * | 7/2005 | Ahmed et al. | 707/10 |
| 2007/0143522 | A1 * | 6/2007 | Wilkinson et al. | 710/310 |

OTHER PUBLICATIONS

"Unified Fabric: Benefits and Architecture of Virtual I/O" White Paper; Cisco Systems, Inc., 2005.*
"Voltaire Fibre Channel Router Module" brochure; Voltaire Inc., 2005.*
"InfiniBand Storage in Limbo"; Storage Magazine; Feb. 2004; accessed on Apr. 8, 2008 via URL <http://searchStorage.techtarget.com/magazineFeature/0,296894,sid5_gci1258610,00.html>.*

* cited by examiner

*Primary Examiner*—Glenn A Auve
(74) *Attorney, Agent, or Firm*—Schwegman, Lundberg & Woessner, P.A.

(57) ABSTRACT

A bridge comprises an InfiniBand port, a fiber channel port, a cut-through data path coupled to the InfiniBand port and fiber channel port comprising a data buffer path operable to store data, and a message control path operable to decode and encode message headers.

19 Claims, 2 Drawing Sheets

DATA CUT-THROUGH IN AN INFINIBAND/FIBRE CHANNEL BRIDGE

RELATED APPLICATIONS

This patent application claims the benefit of priority, under 35 U.S.C. Section 119(e), to U.S. Provisional Patent Application Ser. No. 60/752,688, filed on Dec. 21, 2005, the entire content of which is incorporated herein by reference.

FIELD

The invention relates generally to computer data interfaces, and more specifically to a cut-through data path in an InfiniBand-fibre channel bridge.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computer systems typically include a number of common components, including processors, memory, and hard disk storage. A computer bus couples the various components, often using specific interfaces between the bus and the various computer devices attached to the device. For example, memory and video adapters are often on their own special high-speed buses designed for the particular demands of the attached devices, and hard disk drives are often attached via a storage adapter such as a SATA (serial ATA) or SCSI (small computer system interface) interface coupled between the main computer bus and the storage devices. The interface adapter is designed to communicate with and control a specific type of attached device, such as a SATA hard disk drive or CD-ROM drive, or a SCSI hard disk drive or SCSI tape drive.

In more sophisticated computer systems, hard disk storage interfaces such as SATA are replaced with multiple channels of SCSI adapters, or more sophisticated interfaces such as Fibre Channel or InfiniBand. These interfaces are both high-speed interfaces designed to enable attachment of a number of high-speed peripheral devices such as hard disk drives to a single interface channel, and to enable sophisticated configurations of storage devices such as redundant arrays of independent disk drives (RAID) and storage area networks. Some interface technologies also enable connection of devices other than storage devices, including InfiniBand's support for network interfaces and processor clusters external to a particular server.

But, with a variety of formats available, connection between peripheral devices supporting different standards can be an important factor in achieving the desired configuration or performance of a system. One common solution to such problems is to simply configure a computer system having both types of adapter, so that it can access both types of devices. This involves expense of adding hardware and increases the complexity of the system, and may consume resources such as computer bus slots or processor time that are in high demand. Another solution is to build a special-purpose computer system having interfaces for both systems, designed to act only as a "bridge" between the two interfaces. Such systems typically receive information in one interface format in an interface adapter and decode the data, at which point it can be transferred in the bridge to an interface adapter supporting another interface format for encoding and transmission.

But, such bridge systems are often significantly slower at translating and passing on data than the native speed of either of the interface formats involved, and so are typically a bottleneck in such a bridge system. The performance of a bridge system is therefore a concern to those incorporating a bridge into a computer system.

DETAILED DESCRIPTION

Figure 1:
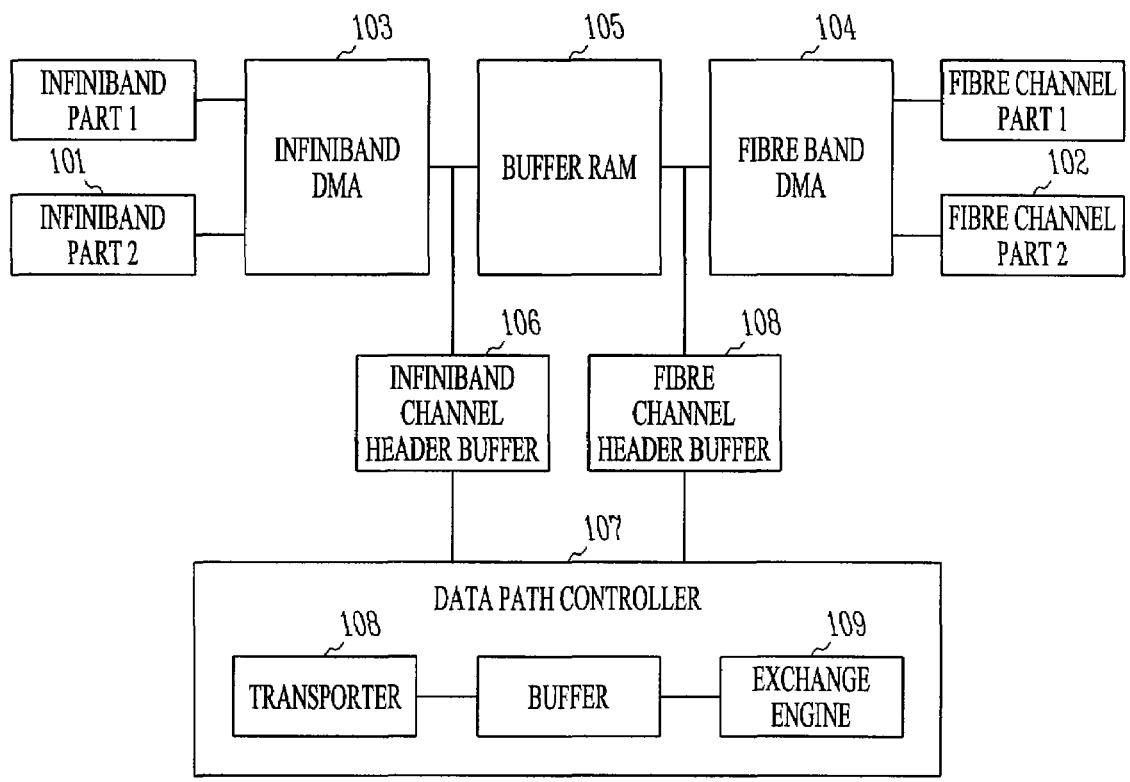
FIG. 1 shows an example of a cut-through data path in a bridge, consistent with an example embodiment of the invention

In the following detailed description of example embodiments of the invention, reference is made to specific example embodiments of the invention by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit other embodiments of the invention or the invention as a whole, and any reference to the invention, its elements, operation, and application do not limit the invention as a whole but serve only to define these example embodiments. The following detailed description does not, therefore, limit the scope of the invention, which is defined only by the appended claims.

In one example embodiment, the invention provides a bridge between InfiniBand and fibre channel format electronic or optical network technologies. The bridge comprises InfiniBand and fibre channel interfaces, as well as a fast path for data transfer and a slow path for command parsing and transfer between the two protocols. In a further embodiment, a third tier of path processing is provided for setup and configuration functions such as to manage logon. The bridge is operable in some embodiments to transport upper-layer protocols such as SCSI via the fibre channel and InfiniBand connections, and to provide both command and data bridging using the slow and fast paths.

Fibre channel is a network technology used primarily for storage networking, and is a recognized ANSI standard network protocol and technology. It includes point-to-point, arbitrated loop, and switched fabric network structures, and is typically carried over either optical fiber or twisted pair copper wire. Fibre channel is a serial communications format, meaning that data is transmitted sequentially rather than in parallel over several physical connections at the same time. Fibre channel includes a physical layer description, defining the physical connections and signaling or coding format used to exchange data, as well as layers supporting advanced function configuration and applications or protocols such as SCSI (small computer system interface), IP (Internet Protocol), the IEEE 802.2 networking protocol, and interprocessor signals in a multiprocessor network.

InfiniBand is also a serial computer communications technology, using high-speed copper wire or optical connection between communicating elements in a computer system or network to exchange data. InfiniBand is commonly used for interprocessor communications in a multiprocessor computing system, and for connection to peripheral devices such as network adapters and storage devices. InfiniBand is promoted as a replacement for the typical shared bus in a computer system due to its switched nature, allowing multiple devices to use the switched network at the same time. InfiniBand includes among its functions a type of remote memory access known as RDMA, or remote direct memory access, enabling one InfiniBand device to directly read or write memory of another InfiniBand device. This feature has become a part of other standards used with Infiniband, such as SCSI RDMA protocol, in which SCSI commands and data transfers are communicated via InfiniBand RDMA exchanges. InfiniBand shall, for purposes of this application, include any such industry standard, channel-based, switched fabric, interconnect architecture known or referred to in the industry as "Infini-Band", including architectures designed to be interoperable with an InfiniBand standard and all such variations of the standard as published by the InfiniBand trade association (www.infinibandta.com) as of the date of filing of this application.

Prior art bridges between Infiniband and fibre channel used a method known as store-and-forward, in which an incoming message is fully received, processed, and stored in an interface before being routed to another interface, where the message is encoded using the new protocol and transmitted. In contrast, various embodiments of the present invention provide for cut-through forwarding of data messages between InfiniBand and fibre channel interfaces, enabling faster bridging of data messages and providing lower latency than prior art bridge architectures.

FIG. 1 shows an example of a cut-through data path in a bridge, consistent with an example embodiment of the invention. This example shows how latency is reduced, and memory storage requirements are reduced by using a cut-through data forwarding data path rather than a traditional store-and-forward path.

A data message is received in either an InfiniBand port 101 or a fibre channel port 102, and is in further embodiments stored and processed using various hardware or software features of the bridge. The InfiniBand interfaces comprise in one example a 4× rate 3 port, including a serializer/deserializer and an 8B/10B data encoder/decoder for deserializing and decoding the received data message. A separate link layer controller is used in one embodiment to manage the physical link layer, such as for link training and link layer or transport layer error management.

Similarly, the fibre channel interfaces 102 in one embodiment run at 1 Gbit or 2 Gbit rates, and also include a serializer/deserializer, an 8B/10B encoder/decoder, and CRC generation and verification logic. Separate clock decoupling and data alignment logic are also provided in one embodiment.

The InfiniBand adapter is coupled to an InfiniBand DMA 103, which is able to be directly read or written by the Infini-Band ports 101 or other attached devices such as the buffer RAM 105 or the InfiniBand channel header buffer 106. The data portion of the message is sent from the InfiniBand DMA to the buffer RAM 105, while the header portion is received in the header buffer 106 for processing in the data path controller 107. Similarly, data from the fibre channel ports 102 is stored in the fibre channel DMA 104, and the fibre channel header information is buffered in the fibre channel header buffer 108 for processing in the data path controller 107.

The data path controller 107 manages data transfer between the InfiniBand ports and the fibre channel ports, and performs translation of header information between Infini-Band and fibre channel formats. The transporter 108 checks InfiniBand path information, such as the primary and alternate network path information and compares it to the Infini-Band header information for data messages received in the InfiniBand ports 101. The transporter 108 is also operable to format InfiniBand headers for messages to be sent via the InfiniBand ports 101, and performs other functions such as request, response, and acknowledge packet processing. The exchange engine 109 performs fibre channel to InfiniBand translation, including verifying the received fibre channel data frames and generating remote direct memory access (RDMA) writes for InfiniBand. The exchange engine also performs other functions, such as receiving RDMA command responses and generating fibre channel frame messages indicating the response when needed.

The data path controller uses a system of credits and completion to allow the data phase of a command/data/response sequence to be processed in the data path, based on availability of resources in the data path. For example, a data message received and stored in the InfiniBand DMA 103 may be stored with its header buffered in the header buffer 106 until the data path controller registers completion of a previous cut-through data exchange, freeing up resources such as buffer RAM 105 or buffer space within the data path controller for the new data message to be handled.

Figure 2:
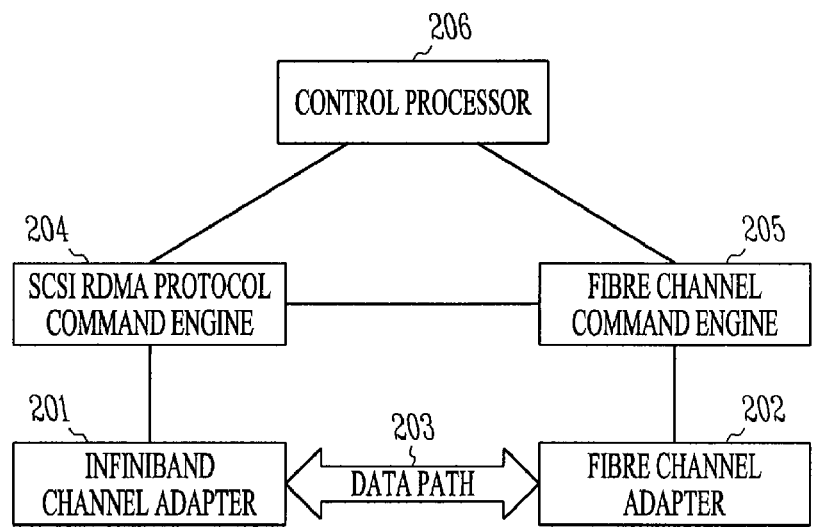
FIG. 2 shows a cut-through data path within a bridge architecture, consistent with an example embodiment of the invention.

The cut-through data path of this bridge example is therefore able to receive and forward data more quickly than a traditional store-and-forward topology, resulting in faster throughput and lower latency than can be achieved with prior art bridges. FIG. 2 shows an example of how the cut-through data path, or fast path of FIG. 1 operates within an example bridge architecture. An InfiniBand channel adapter 201 and a fibre channel adapter 202 are linked by a data path 203, as well as by a command engine path comprising SCSI RDMA protocol engine 204 and fibre channel command engine 205. A control processor 206 is coupled to the command engine path, and is in a further embodiment linked to a memory.

In one example of operation, the control processor is able to establish a connection between an InfiniBand device or network and a fibre channel device or network, handling tasks such as logon and logoff. A SCSI RDMA protocol command is received over the InfiniBand connection in the channel adapter 201, and is forwarded to the SCSI RDMA protocol engine 204 for parsing. The SCSI RDMA protocol engine forwards a fibre channel SCSI command pointer to the fibre channel adapter 202, and the raw SCSI command is forwarded to the fibre channel command engine 205. The SCSI command is sent to the fibre channel adapter, and is transmitted as a fibre channel protocol command from the fibre channel adapter.

A command response is received in the fibre channel adapter, and the response is forwarded from the fibre channel adapter 202 back to the fibre channel command engine 205. The fibre channel command engine notifies the fibre channel adapter 202 that the exchange is complete, and forwards the raw, parsed SCSI response to the SCSI RDMA protocol command engine 204. The SCSI RDMA command engine sends the SCSI RDMA formatted response to the InfiniBand channel adapter 201, where the response is forwarded via the InfiniBand connection to the command issuer.

Commands received in the fibre channel adapter are similarly handled through the command channel of the InfiniBand adapter, which includes SCSI RDMA engine 204 and fibre channel command engine 205. Once a connection is established, commands and data can be sent through the bridge, but data messages do not take the slow path through the command engines 204 and 205, but are communicated via a data path 203 between the InfiniBand adapter 201 and the fibre channel adapter 202 as shown and described in greater detail in FIG. 1. The data channel 203 is in this example called the fast path, because it provides for faster message forwarding than the command path, also known as then slow path. In further embodiments, the bridge is operable to transfer data in both directions between Infiniband and fibre channel-connected devices, and is therefore operable to function as a bidirectional bridge.

Figure 3:
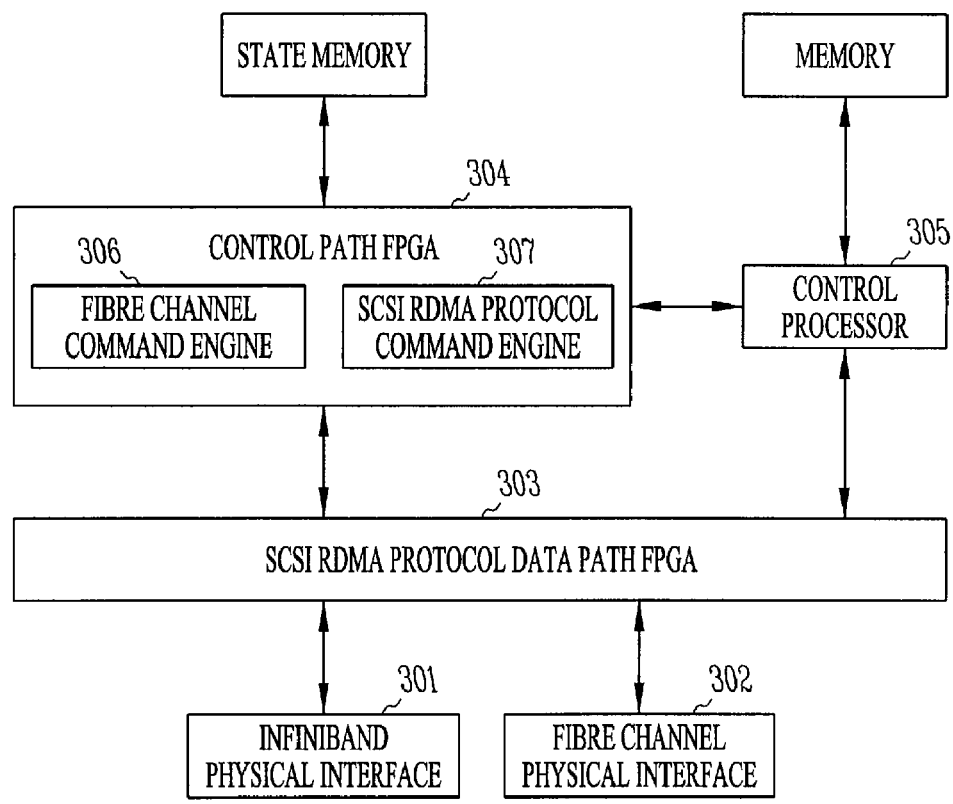
FIG. 3 shows a block diagram of a bridge architecture, consistent with an example embodiment of the invention.

A more detailed example of the architecture of one example implementation of a bridge is shown in FIG. 3. An InfiniBand physical interface 301 and a fibre channel physical interface 302 are coupled to a SCSI RDMA protocol data path FPGA 303, which is operable to transfer data messages between the InfiniBand interface 301 and the fibre channel interface 302 without processing in the control path FPGA 304 or the control processor 305.

The control path FPGA 304 comprises a fibre channel command engine 306 and a SCSI RDMA protocol command engine 307, which are used in the control path or slow path to process commands received in either the InfiniBand interface 301 or the fibre channel interface 302, as shown in greater detail in FIG. 2. The control processor 305 is used to manage configuration of the bridge connection, such as to manage logon and logoff and for exception handling, and is a third tier of processing. This three-tier architecture shown in FIG. 3 enables rapid processing of commands that do not require intervention from the control processor 305, and even faster handling of data through the SCSI RDMA protocol data path 303 that do not contain commands.

The multi-tiered approach incorporating a cut-through path for data handling thereby provides relatively fast handling of data messages, resulting in a bridge with higher throughput and performance than various prior art bridge architectures. Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A bridge, comprising:
    an InfiniBand port;
    a fibre channel port;
    a cut-through data path coupled to the InfiniBand port and fibre channel port, the cut-through data path comprising a data buffer path operable to store data; and
    a message control path operable to decode and encode message headers, such that the cut-through data path is separate from and bypasses the message control path.

2. The bridge of claim 1, the message control path further operable to manage message processing in the data path.

3. The bridge of claim 2, wherein managing processing comprises management of a credit system in which credits are used upon processing a message and released upon completion of processing the message.

4. The bridge of claim 1, wherein the bridge is bidirectional, and is operable to bridge data messages from InfiniBand to fibre channel and to bridge messages from fibre channel to InfiniBand.

5. The bridge of claim 1, further comprising a command path operable to process and transfer commands between the Infiniband interface and the fibre channel interface.

6. The bridge of claim 5, wherein the command path comprises a command path FPGA comprising a fibre channel command engine and a SCSI RDMA command engine.

7. The bridge of claim 1, further comprising a setup path operable to configure a link between the fibre channel adapter and the Infiniband channel adapter.

8. The bridge of claim 7, wherein the setup path comprises a control processor.

9. A method of operating a bridge, comprising:
    storing data in a cut-through data path coupled to an InfiniBand port and a fibre channel port, the data path operable to transfer data between the InfiniBand port and the fibre channel port; and
    decoding and encoding message headers in a message control path, the cut-through data path and message control path comprising paths within the bridge such that the cut-through data path is separate from and bypasses the message control path.

10. The method of claim 9, further comprising managing message processing in the data path via the message control path.

11. The method of claim 10, wherein managing processing comprises management of a credit system in which credits are used upon processing a message and released upon completion of processing the message.

12. The method of claim 9, wherein the bridge is bidirectional, and is operable to bridge data messages from InfiniBand to fibre channel and to bridge messages from fibre channel to InfiniBand.

13. The method of claim 9, further comprising handling command processing and transfer between the Infiniband interface and the fibre channel interface via a command path.

14. The method of claim 13, wherein the command path comprises a command path FPGA comprising a fibre channel command engine and a SCSI RDMA command engine.

15. The method of claim 9, further comprising configuring a link between the fibre channel adapter and the Infiniband channel adapter via a setup path.

16. The method of claim 15, wherein the setup path comprises a control processor.

17. A computerized networked system, comprising:
    an InfiniBand port;
    a fibre channel port; and
    a cut-through data path coupled to the InfiniBand port and fibre channel port, the data path comprising a data buffer path operable to store data; and
    a message control path operable to decode and encode message headers such that the cut-through data path is separate from and bypasses the message control path.

18. The computerized networked system of claim 17, further comprising a command path operable to process and transfer commands between the Infiniband interface and the fibre channel interface.

19. A bridge, comprising:
    storage means for storing data in a cut-through data path providing a data link between an InfiniBand port and a fibre channel port; and
    control means for decoding and encoding message headers in a message control path, the cut-through data path and message control path comprising paths within the bridge such that the cut-through data path is separate from and bypasses the message control path.

* * * * *

UNITED STATES PATENT AND TRADEMARK OFFICE
CERTIFICATE OF CORRECTION

PATENT NO. : 7,568,062 B2
APPLICATION NO. : 11/469383
DATED : July 28, 2009
INVENTOR(S) : Wilkinson et al.

It is certified that error appears in the above-identified patent and that said Letters Patent is hereby corrected as shown below:

In column 2, line 14, after "invention" insert -- . --.

In column 3, line 25, delete "Infiniband" and insert -- InfiniBand --, therefor.

Signed and Sealed this

Twelfth Day of January, 2010

David J. Kappos
*Director of the United States Patent and Trademark Office*